(12) United States Patent
Dojo et al.

(10) Patent No.: US 7,160,660 B2
(45) Date of Patent: Jan. 9, 2007

(54) MAGNETIC TONER

(75) Inventors: Tadashi Dojo, Shizuoka (JP); Nene Shibayama, Shizuoka (JP); Yuichi Mizoo, Ibaraki (JP); Yusuke Hasegawa, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 311 days.

(21) Appl. No.: 10/817,891

(22) Filed: Apr. 6, 2004

(65) Prior Publication Data

US 2004/0229142 A1 Nov. 18, 2004

(30) Foreign Application Priority Data

Apr. 7, 2003 (JP) .............. 2003-102523
Apr. 7, 2003 (JP) .............. 2003-102580
Dec. 26, 2003 (JP) .............. 2003-432551

(51) Int. Cl.
*G03G 9/083* (2006.01)

(52) U.S. Cl. .............. 430/106.1; 430/108.23; 430/108.8; 430/109.4

(58) Field of Classification Search .............. 430/106.1, 430/109.4, 108.23, 108.8
See application file for complete search history.

(56) References Cited

U.S. PATENT DOCUMENTS

| 4,820,603 A | 4/1989 | Sakashita | 430/106.6 |
|---|---|---|---|
| 4,992,191 A | 2/1991 | Mori et al. | 252/62.59 |
| 5,672,454 A * | 9/1997 | Sasaki et al. | 430/110.2 |
| 5,976,752 A | 11/1999 | Matsunaga et al. | 430/110 |
| 6,432,600 B1 | 8/2002 | Suwa et al. | 430/109.1 |
| 2003/0109668 A1 * | 6/2003 | Kubo et al. | 528/274 |
| 2004/0068052 A1 * | 4/2004 | Uosaki et al. | 525/88 |

FOREIGN PATENT DOCUMENTS

| EP | 0 974 870 A1 | 1/2000 |
|---|---|---|
| EP | 0 974 871 A1 | 1/2000 |
| JP | 62-279352 | 12/1987 |
| JP | 03-009045 | 2/1991 |
| JP | 3-185456 | 8/1991 |
| JP | 2001-296689 | 10/2001 |

* cited by examiner

*Primary Examiner*—John L Goodrow
(74) *Attorney, Agent, or Firm*—Fitzpatrick, Cella, Harper & Scinto

(57) ABSTRACT

In a magnetic toner having toner particles containing at least a binder resin and a magnetic material, the binder resin is chiefly composed of a resin having a polyester unit synthesized using as a catalyst a tin compound represented by the following Formula (1), and the magnetic material has a number-average particle diameter of form 0.1 μm to 0.3 μm:

$$(RCOO)_2Sn \qquad \text{Formula (1)}$$

wherein R represents an alkyl group having 5 to 15 carbon atoms. This magnetic toner can attain a stable image density without dependence on environment and enables formation of high-grade images over a long period of time without causing scratches of latent image bearing members.

13 Claims, No Drawings

MAGNETIC TONER

BACKGROUND OF THE INVENTION

1. Field of the Invention

This invention relates to a magnetic toner used in a recording process such as electrophotography, electrostatic recording, electrostatic printing or toner jet recording.

2. Related Background Art

As methods for electrophotography, methods are conventionally known in which copied or printed images are obtained by forming an electrostatic latent image on a photosensitive member by utilizing a photoconductive material and by various means, subsequently developing the electrostatic latent image by the use of a toner to form a toner image, and transferring the toner image to a transfer medium such as paper as occasion calls, followed by fixing by the action of heat, pressure, heat-and-pressure, or solvent vapor.

In a method of developing the electrostatic latent image, a magnetic one-component developing system making use of a magnetic toner is preferably used because it does not require any carrier and is advantageous for making apparatus compact. In the toner used in such a magnetic one-component developing system, a fine powdery magnetic material is mixedly dispersed in a considerable quantity, and the state of presence of this magnetic material has a great influence on the fluidity and triboelectric charging performance of the toner. Also, in the magnetic toner, the magnetic material is used as it is as a colorant in many cases. Accordingly, in order to improve coloring power of the toner, it is important for the magnetic material to be made small in particle diameter and have uniform dispersibility. However, when made small in particle diameter, the magnetic material comes apt to have a reddish tint and also comes very difficult to disperse uniformly in the toner. Hence, this tends to cause various problems.

For example, where toners are made to have small particle diameter in order to improve dot reproducibility in digital machines or the like, a toner containing the magnetic material in a large quantity may accumulate on a toner carrying member (developing sleeve) if the magnetic material stands dispersed insufficiently, image density may lower and the non-uniformity of tone that is called sleeve ghost may occur. Problems may also arise such that the magnetic material tends to come off because of rubbing friction between toner particles themselves or between toner particles and a toner layer thickness control member, and that the magnetic material having come off scratches the photosensitive member (latent image bearing member) to cause defective images.

To cope with this problem, proposals concerning magnetic iron oxides to be contained in magnetic toners have been made, but still there is room for improvement.

For example, Japanese Patent Application Laid-Open No. S62-279352 discloses a magnetic toner containing a magnetic iron oxide incorporated with silicon element. In such a magnetic iron oxide, the silicon element is intentionally brought into existence inside the magnetic iron oxide, but still there is room for improvement in the fluidity of the magnetic toner containing the magnetic iron oxide. Japanese Patent Publication No. H3-9045 discloses adding a silicate to control the particle shape of magnetic iron oxide to be spherical. In the magnetic iron oxide obtained by this method, the silicon element is rich distributed inside the magnetic iron oxide particles because of the use of the silicate for the controlling of particle shape and the silicon element is less present at the surfaces of the magnetic iron oxide particles, thus, because of a high smoothness magnetic iron oxide particles, the fluidity of the magnetic toner can be improved to a certain extent. However, the adhesion between the binder resin and the magnetic iron oxide which constitute the magnetic toner is insufficient.

Meanwhile, a binder resin constituting the toner may include styrene resins, polyester resins and epoxy resins. Polyester resins are preferably used from the viewpoint of low-temperature fixing performance. Also, recently, a method is studied in which two or more types of polyester resins having different softening points are used in the form of a mixture so that fixing temperature range can be broadened. The use of a plurality of resins in the magnetic toner in this way makes it severer to make the magnetic material disperse uniformly in the resins in the step of heat melt-kneading when the toner is produced.

To cope with such a problem, some studies are made in order to improve the dispersibility of the magnetic material. Japanese Patent Application Laid-open No. 2001-296689 discloses an attempt to improve dispersibility by using a specific polyester resin in combination with a magnetic material on the particle surfaces of which carbon black has been adsorbed.

However, this measure is still unsatisfactory when the toner is made small in particle diameter or when the magnetic material with small particle diameter is used.

SUMMARY OF THE INVENTION

An object of the present invention is to provide a toner having solved the problems discussed above, and to provide a magnetic toner which can attain a stable image density without dependence on environment.

Another object of the present invention is to provide a magnetic toner which enables formation of high-grade images over a long period of time without causing scratches of latent image bearing members.

Still another object of the present invention is to provide a magnetic toner having a high coloring power and promising less toner consumption.

The present invention provides a magnetic toner comprising toner particles having at least a binder resin and a magnetic material, wherein;

the binder resin is chiefly composed of a resin having a polyester unit synthesized using as a catalyst a tin compound represented by the following Formula (1), and the magnetic material has a number-average particle diameter of form 0.1 μm to 0.3 μm:

$$(RCOO)_2Sn \qquad \text{Formula (1)}$$

wherein R represents an alkyl group having 5 to 15 carbon atoms.

According to the present invention, the magnetic material with small particle diameter is improved in uniform dispersibility in the resin, so that stable image density can be attained and high-grade images can be formed over a long period of time. Also, according to the present invention, internal additives can stand well dispersed even in toners made to have small particle diameter, and a toner can be obtained which has superior low-temperature fixing performance and may cause no contamination of developing sleeves and fixing rollers even in long-term running.

DESCRIPTION OF THE PREFERRED EMBODIMENTS

In the present invention, the magnetic toner contains at least a binder resin and a magnetic material, and the binder resin is chiefly composed of a resin having a polyester unit. In synthesizing the resin having a polyester unit, a tin compound represented by the following Formula (1) (hereinafter often simply "tin compound") is used as a catalyst.

$$(RCOO)_2Sn \qquad \text{Formula (1)}$$

wherein R represents an alkyl group having 5 to 15 carbon atoms.

This tin compound is a catalyst preferable in esterification reaction and ester exchange reaction, and makes it easy to regulate the softening point and physical properties of the resin, and also enables polymerization in a relatively short time. The tin compound is also present in the resin having a polyester unit after polymerization, and it is considered that this improves the dispersibility of the magnetic material in the resin and the adhesion between the both in the step of heat melt-kneading when the toner is produced, in virtue of the effects described below.

As a first effect, in virtue of the effect due to the alkylcarboxylic acid component (RCOO—) having combined with the tin, the viscosity of the polyester resin at the time of heat melt-kneading is locally lowered, and this makes it easy for the magnetic material to disperse uniformly, and also the presence of the inorganic tin compound makes the magnetic material have low magnetically agglomerative properties, so that the fine dispersibility of the magnetic material in the resin can be improved. Especially when a magnetic material with a small particle diameter of from 0.1 μm to 0.3 μm is used, its fine dispersibility in the resin is dramatically improved, and a toner can be obtained which may less change in charge characteristics because of environment, may cause no release of the magnetic material from the resin, and also has a high coloring power.

As a second effect due to the alkylcarboxylic acid component (RCOO—) having combined with the tin, used in the present invention, there is the action to improve the dispersibility of a release agent in the resin having a polyester unit. That is, the alkylcarboxylic acid component, having a structure similar to a release agent, acts like a compatibilizer between the resin and the release agent in the resin having a polyester unit that has originally so high a polarity as to be disadvantageous in view of compatibility with the release agent. This enables the release agent to be uniformly dispersed in the resin having a polyester unit. Such an alkylcarboxylic acid component is effective especially when a low-melting release agent with a melting point of from 70° C. to 120° C. is used which may be used in the present invention.

The low-melting release agent affords a good low-temperature fixing performance, but on the other hand lowers the viscosity of the toner. Hence, if it stands poorly dispersed in toner particles, any release agent liberated or a toner containing the release agent in a large quantity may adhere to the sleeve surface because of the heat and pressure due to friction when the toner is used over a long period of time under severe conditions as in a high-temperature high-humidity environment, and the toner may further adhere to the toner having adhered, which serves as nuclei. The low-melting release agent also has a poor compatibility with the resin having a polyester unit. Hence, in the toner making use of the resin having a polyester unit, the dispersion particle diameter and surface presence percentage of release agent tend to come non-uniform to make it difficult to obtain a sufficient release effect. However, according to the present invention, the low-melting release agent is uniformly dispersed in toner particles in virtue of the above effects. Hence, the toner may less undergo compositional changes due to environmental variations and long-term running, and can exhibit a superior low-temperature fixing performance and a high release effect.

In the alkylcarboxylic acid tin compound used in the present invention, the alkyl group may most preferably be one having 5 to 15 carbon atoms, from the viewpoint of a catalytic effect on the esterification reaction.

The tin compound may also be added in an amount of from 0.05 to 2.0 parts by weight, and preferably from 0.1 to 1.0 part by weight, based on 100 parts by weight of the binder resin. If it is in an amount of less than 0.05 part by weight, a long reaction time is required at the time of polyester polymerization, and also the effect of improving the dispersibility of the magnetic material may come not obtainable. If on the other hand it is in a content of more than 2 parts by weight, it may affect charge characteristics of the toner to tend to cause great variations in charge quantity because of environment.

The tin compound represented by Formula (1) may include the following as compounds preferably used in the present invention.

Exemplary Compound (1)
  Tin hexanoate: $[CH_3(CH_2)_4COO]_2Sn$

Exemplary Compound (2)
  Tin octanoate: $[CH_3(CH_2)_6COO]_2Sn$

Exemplary Compound (3)
  Tin 2-ethyl hexanoate:

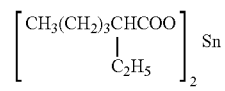

Exemplary Compound (4)
  Tin decanoate: $[CH_3(CH_2)_8COO]_2Sn$

Exemplary Compound (5)
  Tin laurate: $[CH_3(CH_2)_{10}COO]_2Sn$

The binder resin used in the present invention is a binder resin composed chiefly of the resin having a polyester unit, and preferred are a polyester resin and a hybrid resin in which a polyester resin unit and a styrene-acrylic resin unit have chemically combined with each other. Incidentally, in the present invention, "the binder resin is chiefly composed of . . . " is defined as "the binder resin is composed of more than 50% by weight of . . . ".

Monomers for obtaining the polyester resin or polyester unit may include the following.

As a dihydric alcohol component, it may include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, a bisphenol derivative represented by the following Formula (a), and a diol represented by the following Formula (b).

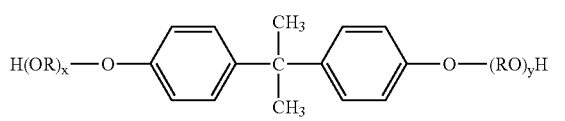

(a)

wherein R represents an ethylene group or a propylene group, x and y are each an integer of 1 or more, and an average value of x+y is 2 to 10.

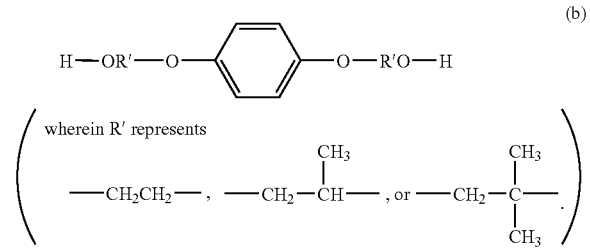

(b)

As a dibasic carboxylic acid, it may include benzene dicarboxylic acids or anhydrides thereof, such as phthalic acid, terephthalic acid, isophthalic acid and phthalic anhydride; alkyldicarboxylic acids such as succinic acid, adipic acid, sebacic acid and azelaic acid, or anhydrides thereof, or succinic acid or its anhydride substituted with an alkyl group or alkenyl group having 6 to 18 carbon atoms; and unsaturated dicarboxylic acids such as fumaric acid, maleic acid, citraconic acid and itaconic acid, or anhydrides thereof.

As other monomers for obtaining the polyester resin or polyester unit may also include polyhydric alcohols such as glycerol, pentaerythritol, sorbitol, sorbitan, and also polyhydric alcohols such as oxyakylene ethers of, e.g., novolak phenol resins; and polybasic carboxylic acids such as trimellitic acid, pyromellitic acid and benzophenonetetracarboxylic acid, and anhydrides thereof.

In the hybrid resin, vinyl monomers for forming the styrene-acrylic resin unit may include the following.

As a styrene monomer, it may include styrene, and styrene derivatives such as o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene and p-nitrostyrene.

As an acrylic monomer, it may include acrylic acid, and acrylic esters such as methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate and phenyl acrylate; α-methylene aliphatic monocarboxylates and esters thereof, such as methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; and acrylic acid or methacrylic acid derivatives such as acrylonitrile, methacrylonitrile and acrylamide.

Monomers for the styrene-acrylic resin unit may further include acrylates or methacrylates such as 2-hydroxyethyl acrylate, 2-hydroxyethyl methacrylate and 2-hydroxypropyl methacrylate; and monomers having a hydroxyl group, such as 4-(1-hydroxy-1-methylbutyl)styrene and 4-(1-hydroxy-1-methylhexyl)styrene.

In the styrene-acrylic resin unit, a monomer of various types capable of vinyl polymerization may also optionally be used in combination. Such a monomer may include ethylene unsaturated monoolefins such as ethylene, propylene, butylene and isobutylene; unsaturated polyenes such as butadiene and isoprene; vinyl halides such as vinyl chloride, vinylidene chloride, vinyl bromide and vinyl fluoride; vinyl esters such as vinyl acetate, vinyl propionate and vinyl benzoate; vinyl ethers such as methyl vinyl ether, ethyl vinyl ether and isobutyl vinyl ether; vinyl ketones such as methyl vinyl ketone, hexyl vinyl ketone and methyl isopropenyl ketone; N-vinyl compounds such as N-vinylpyrrole, N-vinylcarbazole, N-vinylindole and N-vinylpyrrolidone; unsaturated dibasic acids such as maleic acid, citraconic acid, itaconic acid, alkenylsuccinic acids, fumaric acid and mesaconic acid; unsaturated dibasic acid anhydrides such as maleic anhydride, citraconic anhydride, itaconic anhydride and alkenylsuccinic anhydrides; half esters of unsaturated dibasic acids, such as methyl maleate half ester, ethyl maleate half ester, butyl maleate half ester, methyl citraconate half ester, ethyl citraconate half ester, butyl citraconate half ester, methyl itaconate half ester, methyl alkenylsuccinate half ester, methyl fumarate half ester, and methyl mesaconate half ester; unsaturated dibasic esters such as dimethyl maleate and dimethyl fumarate; α,β-unsaturated acids such as acrylic acid, methacrylic acid, crotonic acid and cinnamic acid; anhydrides of the α,β-unsaturated acids with lower fatty acids; and alkenylmalonic acids, alkenylglutaric acids, alkenyladipic acids, acid anhydrides of these and monoesters of these.

The styrene-acrylic resin component (unity) may also optionally be a polymer cross-linked with a cross-linkable monomer which is as exemplified below.

The cross-linkable monomer may include, e.g., aromatic divinyl compounds, diacrylate compounds linked with an alkyl chain, diacrylate compounds linked with an alkyl chain containing an ether linkage, diacrylate compounds linked via an aromatic group and an ether linkage, polyester type diacrylate compounds, and polyfunctional cross-linking agents.

The aromatic divinyl compounds may include, e.g., divinylbenzene and divinylnaphthalene.

The diacrylate compounds linked with an alkyl chain may include, e.g., ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and the above compounds whose acrylate moiety has been replaced with methacrylate.

The diacrylate compounds linked with an alkyl chain containing an ether linkage may include, e.g., diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and the above compounds whose acrylate moiety has been replaced with methacrylate.

The diacrylate compounds linked with a chain containing an aromatic group and an ether bond may include, e.g., polyoxyethylene(2)-2,2-bis(4-hydroxyphenyl)propane diacrylate, polyoxyethylene(4)-2,2-bis(4-hydroxyphenyl)propane diacrylate, and the above compounds whose acrylate moiety has been replaced with methacrylate.

The polyester type diacrylate compounds may include, e.g., MANDA (trade name; available from Nippon Kayaku Co., Ltd.).

The polyfunctional cross-linking agents may include, e.g., pentaerythritol triacrylate, trimethylolethane triacrylate, trimethylolpropane triacrylate, tetramethylolmethane tetraacrylate, oligoester acrylate, and the above compounds whose acrylate moiety has been replaced with methacrylate; triallylcyanurate, and triallyltrimellitate.

Any of these cross-linkable monomers may preferably be used in an amount of from 0.01 to 10 parts by weight, and more preferably from 0.03 to 5 parts by weight, based on 100 parts by weight of other monomer components. Also, what may preferably be used in view of fixing performance and anti-offset properties among these cross-linkable monomers may include the aromatic divinyl compounds (in particular, divinylbenzene) and the diacrylate compounds linked with a chain containing an aromatic group and an ether bond.

In obtaining the styrene-acrylic resin unit, a polymerization initiator as shown below may be used. Such a polymerization initiator may include, e.g., azo or diazo types such as 2,2'-azobisisobutyronitrile, 2,2'-azobis-(4-methoxy-2,4-dimethylvaleronitrile), 2,2'-azobis-(2,4-dimethylvaleronitrile), 2,2'-azobis-(2-methylbutyronitrile), dimethyl-2,2'-azobisisobutyrate, 1,1'-azobis-(1-cyclohexanecarbonitrile), 2-(carbamoylazo)isobutyronitrile, 2,2'-azobis-(2,4,4-trimethylpentane), 2-phenylazo-2,4-dimethyl-4-methoxyvaleronitrile and 2,2'-azobis-(2-methylpropane); ketone peroxides such as methyl ethyl ketone peroxide, acetylacetone peroxide and cylcohexanone peroxide; and other types such as 2,2-bis(t-butylperoxy)butane, t-butyl hydroperoxide, cumene hydroperoxide, 1,1,3,3-tetramethylbutyl hydroperoxide, di-t-butyl peroxide, t-butylcumyl peroxide, dicumyl peroxide, α,α'-bis(t-butylperoxyisopropyl) benzene, isobutyl peroxide, octanoyl peroxide, decanoyl peroxide, lauroyl peroxide, 3,5,5-trimethylhexanoyl peroxide, benzoyl peroxide, m-trioyl peroxide, di-isopropyl peroxydicarbonate, di-2-ethylhexyl peroxydicarbonate, di-n-propyl peroxydicarbonate, di-2-ethoxyethyl peroxydicarbonate, dimethoxyisopropyl peroxydicarbonate, di(3-methyl-3-methoxybutyl)peroxydicarbonate, acetylcylohexylsulfonyl peroxide, t-butyl peroxyacetate, t-butyl peroxyisobutyrate, t-butyl peroxyneodecanoate, t-butyl peroxy-2-ethylhexanoate, t-butyl peroxylaurate, t-butyl peroxylbenzoate, t-butyl peroxyisopropylcarbonate, di-t-butyl peroxyisophtalate, t-butyl peroxyallylcarbonate, t-amyl peroxy-2-ethylhexanoate, di-t-butyl peroxyhexahydrophthalate and di-t-butyl peroxyazelate.

The above hybrid resin is a resin in which the polyester resin unit and the styrene-acrylic resin unit have directly or indirectly chemically combined with each other, and is constituted of the above polyester resin component and styrene-acrylic resin component and a monomer component capable of reacting with both the resin components.

Among monomers constituting the polyester resin unit, a monomer component capable of reacting with the styrene-acrylic resin unit may include, e.g., unsaturated dicarboxylic acids such as fumaric acid, maleic acid, citraconic acid and itaconic acid, or anhydrides thereof.

Among monomers constituting the styrene-acrylic resin unit, a monomer component capable of reacting with the polyester resin component may include monomers having a carboxyl group or a hydroxyl group, and acrylates or methacrylates.

As a method for obtaining the hybrid resin, a method is preferred in which polymerization reaction for any one or both of the polyester resin and the styrene-acrylic resin is carried out in the state that a polymer containing monomer components capable of respectively reacting with these resins is present.

In order to satisfy the effect of the present invention, the hybrid resin may preferably contain the polyester resin unit in an amount of 50 parts by weight or more, and more preferably 70 parts by weight or more.

The polyester resin and hybrid resin used in the present invention may contain a resin cross-linked with a tribasic or higher polybasic carboxylic acid (or an acid anhydride thereof) and/or a trihydric or higher polyhydric alcohol. This is preferable in order to achieve both low-temperature fixing performance and high-temperature anti-offset properties.

The tribasic or higher polybasic carboxylic acid or an acid anhydride thereof may include, e.g., 1,2,4-benzenetricarboxylic acid, 1,2,4-cyclohexanetricarboxylic acid, 1,2,4-naphthalenetricarboxylic acid, pyromellitic acid, and acid anhydrides or lower alkyl esters of these. The trihydric or higher polyhydric alcohol may include, e.g., 1,2,3-propanetriol, trimethylolpropane, hexanetriol and pentaerythritol. Preferred are 1,2,4-benzenetricarboxylic acid and acid anhydrides thereof.

In the present invention, in order to broaden the fixing temperature range, it is preferable to use, in the form of a mixture, two or more types of polyester resins or hybrid resins having different softening points.

In the present invention, in order to broaden the fixing temperature range, it is preferable to use, in the form of a mixture, two or more types of resins containing polyester units having different softening points. Stated specifically, it is preferable to use, in the form of a mixture, resins having softening points of from 80° C. to 120° C. and from 120° C. to 160° C.

The binder resin used in the present invention may preferably have a glass transition point of from 45° C. to 65° C. Within this range, the binder resin is preferable in view of achievement of both low-temperature fixing performance and storage stability.

The binder resin may also preferably have an acid value of from 1 to 50 mg·KOH/g. Within this range, the binder resin is preferable in view of the achievement of both charge characteristics and environmental stability.

As the magnetic material used in the magnetic toner of the present invention, any of conventionally known magnetic materials may be used. The magnetic material to be incorporated in the magnetic toner may include iron oxides such as magnetite, maghemite and ferrite, and iron oxides including other metal oxides; metals such as Fe, Co and Ni, or alloys of any of these metals with any of metals such as Al, Co, Cu, Pb, Mg, Ni, Sn, Zn, Sb, Be, Bi, Cd, Ca, Mn, Se, Ti, W and V, and mixtures of any of these.

As magnetic materials, conventionally known are triiron tetraoxide ($Fe_3O_4$), iron sesquioxide ($\gamma$-$Fe_2O_3$), zinc iron oxide ($ZnFe_2O_4$), yttrium iron oxide ($Y_3Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), nickel iron oxide ($NiFe_2O_4$), neodymium iron oxide ($NdFe_2O_3$), barium iron oxide ($BaFe_{12}O_{19}$), magnesium iron oxide ($MgFe_2O_4$), manganese iron oxide ($MnFe_2O_4$), lanthanum iron oxide ($LaFeO_3$), iron powder (Fe), cobalt powder (Co) and nickel powder (Ni). In the present invention, at least magnetic iron oxide may be contained as the above magnetic material, and one or two or more of other materials may optionally be used.

These magnetic materials may preferably be those having a coercive force of from 1.5 kA/m to 12.0 kA/m, a saturation magnetization of from 50 to 200 Am$^2$/kg (preferably from 50 to 100 Am$^2$/kg) and a residual magnetization of from 2 to 20 Am$^2$/kg, as magnetic properties under application of a magnetic field of 795.8 kA/m (10 kOe). The magnetic properties of the magnetic material may be measured with a vibration type magnetic-force meter, e.g., VSM P-1-10 (manufactured by Toei Industry Co., Ltd.) at 25° C. and under application of an external magnetic field of 769 kA/m.

In the magnetic toner of the present invention, the magnetic material may preferably be the magnetic iron oxide, which may include, e.g., fine powders of triiron tetraoxide and γ-iron sesquioxide. This magnetic iron oxide may also be contained in toner particles in an amount of from 20 to 150 parts by weight based on 100 parts by weight of the binder resin. This is preferable in order for the toner to show magnetic properties good enough to prevent toner scatter while maintaining its fluidity and also to exhibit a sufficient coloring power.

Incidentally, in the present invention, the magnetic material as a colorant may be one having appropriately been subjected to surface hydrophobic treatment with an appropriate surface hydrophobic treating agent, depending on initial-stage physical properties of the toner and conditions for producing the toner particles.

In the present invention, the magnetic material has a number-average particle diameter of from 0.1 μm to 0.3 μm. If it has a number-average particle diameter of less than 0.1 μm, the magnetic material itself may have a reddish tint, so that the toner may also gain a reddish tint. At the same time, the magnetic material may have a poor dispersibility in the resin to tend to cause a lowering of developing performance as a result of running or make the latent image bearing member scraped by the magnetic material released. If on the other hand it has a number-average particle diameter of more than 0.3 μm, the toner may have a low coloring power to cause an increase in toner consumption in an attempt to obtain high-grade images.

In the present invention, the magnetic material may also preferably be incorporated with a metal of a different type, such as silicon, zinc or titanium, in particle interiors and/or at particle surfaces. This is because its interaction with the alkylcarboxylic acid tin compound makes it possible to further lower the magnetically agglomerative properties of the magnetic material at the time of melt-kneading, and enables improvement in the dispersibility of the magnetic material in the toner particles.

In the present invention, the toner particles may optionally be incorporated with other colorant. Such a colorant may include carbon black, and all sorts of conventionally known pigments or dyes, one or two or more of which may be used.

In the present invention, other additives may optionally be added to the toner particles. As such other additives, additive of various types may be used which are conventionally known to be added to the interiors of toner particles, and may include a release agent and a charge control agent.

What are preferred as the release agent may include aliphatic hydrocarbon waxes such as low-molecular weight polyethylene, low-molecular weight polypropylene, microcrystalline wax and paraffin wax, oxides of aliphatic hydrocarbon waxes, such as polyethylene oxide wax, or block copolymers of these; waxes composed chiefly of a fatty ester, such as carnauba wax, sasol wax and montanate wax; those obtained by subjecting part or the whole of fatty esters to deoxidizing treatment, such as dioxidized carnauba wax; saturated straight-chain fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, ceryl alcohol and melissyl alcohol; polyhydric alcohols such as sorbitol; fatty acid amides such as linolic acid amide, oleic acid amide and lauric acid amide; saturated fatty acid bisamides such as methylenebis(stearic acid amide), ethylenebis(capric acid amide), ethylenebis(lauric acid amide) and hexamethylenebis(stearic acid amide); unsaturated fatty acid amides such as ethylenebis(oleic acid amide), hexamethylenebis (oleic acid amide), N,N'-dioleyladipic acid amide and N,N'-dioleylsebasic acid amide; aromatic bisamides such as m-xylenebisstearic acid amide, N,N'-distearylisophthalic acid amide; fatty acid metal salts (those commonly called metal soap) such as calcium stearate, calcium laurate, zinc stearate and magnesium stearate; grafted waxes obtained by grafting vinyl monomers such as styrene or acrylic acid to fatty acid hydrocarbon waxes; partially esterified products of polyhydric alcohols with fatty acids, such as monoglyceride behenate; methyl esterified product having a hydroxyl group, obtained by hydrogenation of vegetable fats and oils; and long-chain alkyl alcohols of long-chain alkyl carboxylic acids, which have 12 or more carbon atoms.

Release agents particularly preferably usable in the present invention may include aliphatic hydrocarbon waxes. Such aliphatic hydrocarbon waxes may include, e.g., low-molecular weight alkylene polymers obtained by polymerizing alkylenes by radical polymerization under high pressure, or by polymerization under low pressure in the presence of a Ziegler catalyst; alkylene polymers obtained by thermal decomposition of high-molecular weight alkylene polymers; synthetic hydrocarbon waxes obtained from distillation residues of hydrocarbons obtained by the Arge process from synthetic gases containing carbon monoxide and hydrogen, and synthetic hydrocarbon waxes obtained by hydrogenation of the same; and aliphatic hydrocarbon waxes fractionated by utilizing press sweating, solvent fractionation or vacuum distillation, or by a fractionation recrystallization system.

The hydrocarbon, serving as a matrix of the aliphatic hydrocarbon waxes, may include, e.g., those synthesized by reacting carbon monoxide with hydrogen in the presence of a metal oxide type catalyst (usually catalysts of a two or more multiple system), as exemplified by hydrocarbons obtained by the Synthol method or the Hydrocol process (making use of a fluidized catalyst bed); hydrocarbons having about several hundred carbon atoms obtained by the Arge process (making use of a fixed catalyst bed) which can obtain waxy hydrocarbons in a large quantity; and hydrocarbons obtained by polymerization of alkylenes such as ethylene in the presence of a Ziegler catalyst. Of these hydrocarbons, they may preferably be less- and small-branched, saturated long straight chain hydrocarbons. In particular, hydrocarbons synthesized by the method not relying on the polymerization of alkylenes are preferred in view of their molecular weight distribution.

In the present invention, the release agent may be so contained in the toner particles that an endothermic main peak may appear in the range of 70° C. to 140° C. in the DSC curve obtained when toner particles containing the release agent are measured with a differential scanning calorimeter. This is preferable in view of low-temperature fixing performance and high-temperature anti-offset properties of the toner.

The magnetic toner of the present invention may also preferably contain a release agent having a melting point of from 70° C. to 120° C. as defined by endothermic peak temperature at the time of heating in measurement with a differential scanning calorimeter (DSC). The release agent may more preferably have a melting point of from 80° C. to 115° C., and still more preferably from 90° C. to 110° C. If the release agent has a melting point of less than 70° C., the toner may have a low viscosity to have a low release effect, to cause contamination on developing members and cleaning members as a result of running. If it has a melting point of more than 120° C., it may be difficult to achieve the desired low-temperature fixing performance.

In regard to molecular weight distribution as measured by gel permeation chromatography (GPC) of the release agent, the ratio of weight-average molecular weight (Mw) to number-average molecular weight (Mn), Mw/Mn, may preferably be 1.2 to 2.0. If the Mw/Mn is less than 1.2, the release agent may have a low dispersibility in the binder resin to come liberated out of toner particles to cause contamination on developing members and cleaning members. If the Mw/Mn is more than 2.0, the rapid melting properties of the toner may lower to make it difficult to achieve the desired fixing performance.

The release agent may also preferably be added in an amount of from 1 to 30 parts by weight based on 100 parts by weight of the binder resin. If it is in an amount of less than 1 part by weight, the desired release effect may not sufficiently be obtained. If it is contained in an amount of more than 30 parts by weight, it may be so poorly dispersed in toner particles as to cause toner adhesion to photosensitive members and surface contamination on developing members and cleaning members, tending to cause problems of, e.g., deterioration of images reproduced.

In the present invention, as the timing at which the release agent is added, it may preferably be added at the time the binder resin is produced. This makes it easy to more bring out the effect like that of a compatibilizer, brought by the alkylcarboxylic acid component used as a catalyst when the binder resin is produced, and hence the low-melting release agent (wax) can more uniformly be dispersed in toner particles. Also, since the release agent is beforehand dispersed in toner particles, this is preferable because the effect of dispersing the magnetic material in toner particles can be made higher at the time of heat melt-kneading for producing the toner particles.

The endothermic peak temperature may be measured with a differential scanning calorimeter of a highly precise, inner-heat input compensation type as exemplified by DSC-7, manufactured by Perkin-Elmer Corporation, and according to ASTM D3418-82. The temperature at which the above peak appears may be controlled by using a release agent whose melting point, glass transition point and degree of polymerization have appropriately been controlled. Incidentally, the above DSC-7 may be used for measuring the peak temperature, and besides for measuring temperatures showing thermal physical properties of toner particles and toner particle materials, such as the glass transition point and softening point of the binder resin and the melting point of the wax.

The release agent may preferably be contained in the toner particles in an amount of from 2 to 15 parts by weight based on 100 parts by weight of the binder resin, in view of fixing performance and charge characteristics.

In the magnetic toner of the present invention, a charge control agent may be used in order to make its charging performance stable. The charge control agent may commonly preferably be contained in the toner particles in an amount of from 0.1 to 10 parts by weight, and more preferably from 0.1 to 5 parts by weight, based on 100 parts by weight of the binder resin, which may differ depending on the type of the charge control agent, the physical properties of toner particle constituent materials, and so forth. As the charge control agent, one capable of controlling the toner to be negatively chargeable and one capable of controlling it to be positively chargeable are known in the art. One or two or more types of various charge control agents may be used in accordance with the types of toners and their uses.

As charge control agents capable of controlling the toner to be negatively chargeable, organic metal complexes or chelate compounds for example are effective, which may include, as examples thereof, monoazo metal complexes, acetylacetone metal complexes, metal compounds of aromatic hydroxycarboxylic acids or aromatic dicarboxylic acids. Besides, those capable of controlling the toner to be negatively chargeable may include, e.g., aromatic mono- or polycarboxylic acids, and metal salts, anhydrides or esters thereof; and phenol derivatives such as bisphenol.

Charge control agents capable of controlling the toner to be positively chargeable may include, e.g., Nigrosine, and modified products thereof, modified with a fatty metal salt; quaternary ammonium salts such as tributylbenzylammonium 1-hydroxy-4-naphthosulfonate and tetrabutylammonium teterafluoroborate, and analogues of these, i.e., onium salts such as phosphonium salts, and lake pigments of these; triphenylmethane dyes and lake pigments of these (lake-forming agents may include tungstophosphoric acid, molybdophosphoric acid, tungstomolybdophosphoric acid, tannic acid, lauric acid, gallic acid, ferricyanides and ferrocyanides); metal salts of higher fatty acids; diorganotin oxides such as dibutyltin oxide, dioctyltin oxide and dicyclohexyltin oxide; and diorganotin borates such as dibutyltin borate, dioctyltin borate and dicyclohexyltin borate. In the present invention, any of these may be used alone or in combination of two or more types. Charge control resins may also be used, which may also be used in combination with any of the above charge control agent. Of these, as those capable of controlling the toner to be positively chargeable, charge control agents such as Nigrosine compounds and quaternary ammonium salts may preferably be used.

Incidentally, the magnetic toner of the present invention may preferably be negatively chargeable, from the viewpoint of physical properties of toner materials and so forth, where, as the charge control agent, azo type iron complexes or aromatic oxycarboxylic acid metal compounds may preferably be used in view of the dispersibility of the magnetic material in the binder resin.

The magnetic toner of the present invention may preferably have a dielectric dissipation factor (tan δ) within the range of from $1 \times 10^{-3}$ to $6 \times 10^{-3}$, measured at a frequency of 100 kHz. Where its dielectric dissipation factor is within this range, the magnetic material can stand well dispersed in toner particles, making it possible to keep charge characteristics from varying because of environment and effectively keep the latent image bearing member from being scraped because of any magnetic material released from toner particles. The dielectric dissipation factor of the toner may be found by measuring complex dielectric constant at a frequency of 100 kHz after correction is made at frequencies of 1 kHz and 1 MHz, using 4284A Precision LCR Meter (manufactured by Hewlett-Packard Co.).

The magnetic toner of the present invention is used in the state that various materials according to the type of the toner are externally added to the toner particles. As materials to be externally added, they may include external additives such as a fluidity improver for improving the fluidity of the toner, as exemplified by an inorganic fine powder, and a conductive fine powder for controlling the charging performance of the toner, such as a fine metal oxide powder.

The fluidity improver may include those which can improve the fluidity of the toner by its external addition to toner particles. Such a fluidity improver may include, e.g., fluorine resin powders such as fine vinylidene fluoride powder and fine polytetrafluoroethylene powder; fine silica powders such as wet-process silica and dry-process silica, as well as fine titanium oxide powder and fine alumina powder; and treated silica powder, treated titanium oxide powder and treated alumina powder which are obtained by subjecting the above powders to surface treatment with a silane coupling agent, a titanium coupling agent or a silicone oil.

It is preferable for the fluidity improver to have a specific surface area of 30 m$^2$/g or more, and more preferably preferably 50 m$^2$/g or more, as measured by the BET method utilizing nitrogen absorption. The fluidity improver may preferably be mixed in an amount of, e.g., which may differ depending on the type of the fluidity improver, from 0.01 to 8 parts by weight, and more preferably from 0.1 to 4 parts by weight, based on 100 parts by weight of the toner particles.

A preferred fluidity improver is a fine powder produced by vapor phase oxidation of a silicon halide, which is called dry-process silica or fumed silica. For example, such silica is one which utilizes, e.g., heat decomposition oxidation reaction in oxygen-and-hydrogen of silicon tetrachloride gas. The reaction basically proceeds in a scheme as follows:

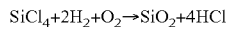

$$SiCl_4 + 2H_2 + O_2 \rightarrow SiO_2 + 4HCl$$

In this production step, it is also possible to use other metal halide such as aluminum chloride or titanium chloride together with the silicon halide to obtain a composite fine powder of silica with other metal oxide. The silica finer powder used as the fluidity improver in the present invention includes such a composite fine powder as well. As to its particle diameter, it may preferably have an average primary particle diameter within the range of from 0.001 to 2 μm, and particularly preferably within the range of from 0.002 to 0.2 μm.

Commercially available fine silica powders produced by the vapor phase oxidation of silicon halides may include, e.g., those which are on the market under the following trade names: Aerosil 130, 200, 300, 380, TT600, MOX170, MOX80, COK84 (Aerosil Japan, Ltd.); Ca—O—SiL M-5, MS-7, MS-75, HS-5, EH-5 (CABOT Co.); Wacker HDK N20, V15, N20E, T30, T40 (WACKER-CHEMIE GMBH); D-C Fine Silica (Dow-Corning Corp.); and Fransol (Franzil Co.).

In the present invention, it is preferable for the fine silica powder to have been subjected to hydrophobic treatment. The fine silica powder may be fine silica powder having been so treated that its hydrophobicity as measured by a methanol titration test shows a value within the range of from 30 to 80 degrees. Such a fine silica powder is particularly preferred in order to bring out toner's physical properties that are stable also to environmental variations. The hydrophobicity is expressed as volume percentage of methanol in a liquid mixture of methanol and water that is formed when methanol is dropwise added to a stated quantity of fine silica powder kept stirred in water and the fine silica powder has finished settling.

As a method for making the fine silica powder hydrophobic, a method is available in which, e.g., the fine silica powder is chemically treated with an organosilicon compound or silicone oil capable of reacting with the fine silica powder or physically adsorptive on fine silica particles. Preferred is hydrophobic treatment with an organosilicon compound.

The organosilicon compound may include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and having a hydroxyl group bonded to each Si in its units positioned at the terminals. Any of these may be used alone or in the form of a mixture of two or more types.

In the hydrophobic treatment of the fine silica powder, among the above organosilicone compounds, one or two or more types of silane coupling agents further having a nitrogen atom may be used. Such a nitrogen-containing silane coupling agent may include, e.g., aminopropyltrimethoxysilane, aminopropyltriethoxysilane, dimethylaminopropyltrimethoxysilane, dimethylaminopropylmethyldiethoxysilane, diethylaminopropyltrimethoxysilane, dipropylaminopropyltrimethoxysilane, dibutylaminopropyltrimethoxysilane, monobutylaminopropyltrimethoxysilane, dioctylaminopropyltrimethoxysilane, dibutylaminopropylmethyldimethoxysilane, dibutylaminopropylmonomethoxysilane, dimethylaminophenyltriethoxysilane, trimethoxysilyl-γ-propylphenylamine, and trimethoxysilyl-γ-propylbenzylamine.

In the present invention, as a preferred silane coupling agent, it may include hexamethyldisilazane (HMDS).

As the silicone oil which may also preferably used for the hydrophobic treatment of the fine silica powder, it may preferably have a viscosity at 25° C. of from 0.5 to 10,000 mm$^2$/s, more preferably from 1 to 1,000 mm$^2$/s, and still more preferably from 10 to 200 mm$^2$/s. Also, as a particularly preferred silicone oil, it may include, e.g., dimethylsilicone oil, methylphenylsilicone oil, α-methylstyrene modified silicone oil, chlorophenylsilicone oil, and fluorine modified silicone oil.

As methods for the fine silica powder's surface hydrophobic treatment making use of the silicone oil, available are a method in which the fine silica powder treated with a silane coupling agent and the silicone oil are directly mixed by means of a mixing machine such as a Henschel mixer; a method in which the silicone oil is sprayed on the fine silica powder serving as a base; and a method in which the silicone oil is first dissolved or dispersed in a suitable solvent, and then the fine silica powder is added, followed by removal of the solvent.

In the case when the surface hydrophobic treatment of the fine silica powder is made using the silicone oil, it is more preferable that the fine silica powder having been treated with the silicone oil is heated to 200° C. or more (preferably 250° C. or more) in an inert gas to make surface coatings stable.

In the present invention, both the silane coupling agent and the silicone oil as described above may be used in the surface hydrophobic treatment of the fine silica powder. As methods for such surface hydrophobic treatment, available are a method in which the fine silica powder is beforehand treated with the silane coupling agent and thereafter treated with the silicone oil, and a method in which the fine silica powder is simultaneously treated with the silane coupling agent and the silicone oil.

The magnetic toner of the present invention requires no particular limitations on how to produce it. A method is preferred in which the binder resin, magnetic material and optionally other additives which have been described above are thoroughly mixed by means of a mixing machine such as a Henschel mixer or a ball mill, then the mixture is melt-kneaded by means of a heat kneading machine such as a kneader or an extruder to make resins melt one another, the melt-kneaded product obtained is cooled to solidify, thereafter the solidified product is pulverized, and the pulverized product is classified to obtain toner particles. The toner particles thus obtained and the external additives such as the fluidity improver may optionally thoroughly be mixed by means of a mixing machine such as a Henschel mixer to obtain the magnetic toner of the present invention.

In producing the magnetic toner of the present invention, the classification may be carried out at any time after the formation of toner particles. For example, it may be carried out after the toner particles have been mixed with external additives. Also, any suitable impact such as mechanical or thermal one may be applied to control the particle shape of the toner particles (stated more specifically, to make spherical).

In the present invention, as a method for pulverizing the above solidified product, a method in which mechanical impact is applied is preferred. As treatment in which the mechanical impact is applied, available are, e.g., a method making use of a mechanical impact type pulverizer such as KTM, a pulverizer manufactured by Kawasaki Heavy Industries, Ltd., or Turbo mill, manufactured by Turbo Kogyo Co., Ltd., and a method of making treatment by means of an apparatus such as a mechanofusion system manufactured by Hosokawa Micron Corporation, or a hybridization system manufactured by Nara Machinery Co., Ltd. These apparatus may be used as they are, or may be used after their appropriate improvement.

The magnetic toner of the present invention may also preferably have a weight-average particle diameter of from 3 μm to 9 μm in view of image density, resolution and so forth.

As apparatus used for the production of the toner, those commonly used are shown below. Examples are by no means limited to these.

TABLE 1

Examples of Pulverizer for Toner Production

| Name of apparatus | Manufacturer |
|---|---|
| Counter Jet Mill | Hosokawa Micron Corporation |
| Micron Jet | Hosokawa Micron Corporation |
| IDS-type Mill | Nippon Pneumatic MFG. Co., Ltd. |
| PJM Jet Grinding Mill | Nippon Pneumatic MFG. Co., Ltd. |
| Cross Jet Mill | Kurimoto, Ltd. |
| Ulmax | Nisso Engineering Co., Ltd. |
| SK Jet O-Mill | Seishin Enterprise Co., Ltd. |
| Criptron | Kawasaki Heavy Industries, Ltd |
| Turbo Mill | Turbo Kogyo Co., Ltd. |
| Inomizer | Hosokawa Micron Corporation |

TABLE 2

Examples of Classifier for Toner Production

| Name of apparatus | Manufacturer |
|---|---|
| Classyl | Seishin Enterprise Co., Ltd. |
| Micron Classifier | Seishin Enterprise Co., Ltd. |
| Spedic Classifier | Seishin Enterprise Co., Ltd. |
| Turbo Classifier | Nisshin Engineering Inc. |
| Micron Separator | Hosokawa Micron Corporation |
| Turboprex(ATP) | Hosokawa Micron Corporation |
| TSP Separator | Hosokawa Micron Corporation |
| Elbow-Jet | Nittestsu Mining Co., Ltd. |
| Dispersion Sparator | Nippon Pneumatic MFG. Co., Ltd. |
| YM Microcut | Yasukawa Shoji K. K. |

TABLE 3

Examples of Sifter for Toner Production

| Name of apparatus | Manufacturer |
|---|---|
| Ultrasonics | Koei Sangyo Co., Ltd. |
| Rezona Sieve | Tokuju Corporation |
| Vibrasonic Sifter | Dulton Company Limited |
| Sonicreen | Shinto Kogio Co., Ltd. |
| Gyro Sifter | Tokuju Corporation |
| Circular vibration sifters | many manufacturers |
| Turbo-Screener | Turbo Kogyo Co., Ltd. |
| Microsifter | Makino mfg. co., ltd. |

TABLE 4

Examples of Mixing Apparatus for Toner Production

| Name of apparatus | Manufacturer |
|---|---|
| Henschel Mixer | Mitsui Mining & Smelting Co., Ltd. |
| Super Mixer | Kawata MFG Co., Ltd. |
| Conical Ribon Mixer | Y. K. Ohkawara Seisakusho |
| Nauta Mixer | Hosokawa Micron Corporation |
| Spiral Pin Mixer | Pacific Machinery & Engineering Co., Ltd. |
| Rhedige Mixer | Matsubo Corporation |
| Turbulizer | Hosokawa Micron Corporation |
| Cyclomix | Hosokawa Micron Corporation |

TABLE 5

Examples of Kneading Apparatus for Toner Production

| Name of apparatus | Manufacturer |
|---|---|
| KRC Kneader | Kurimoto, Ltd. |
| Buss Kneader | Coperion Buss Ag. |
| TEM-type Extruder | Toshiba Machine Co., Ltd. |
| TEX Twin-screw Extruder | The Japan Steel Works, Ltd. |
| PCM Kneader | Ikegai, Ltd. |
| Three-Roll Mill | Inoue Manufacturing Co., Ltd. |
| Mixing Roll Mill | Inoue Manufacturing Co., Ltd. |
| Kneader | Inoue Manufacturing Co., Ltd. |
| Kneadex | Mitsui Mining & Smelting Co., Ltd. |
| MS-type Pressure Kneader | Moriyama Manufacturing Co., Ltd. |
| Kneader-Ruder | Moriyama Manufacturing Co., Ltd. |
| Banbury Mixer | Kobe Steel, Ltd. |

Physical properties according to the magnetic toner of the present invention are measured by methods shown below. Examples given later are also based on these methods.

(i) Measurement of Particle Diameter of Magnetic Material:

The average particle diameter of the magnetic material may be measured with, e.g., a laser diffraction particle size distribution meter (manufactured by Horiba, Ltd.).

(ii) Measurement of Softening Point of Resin:

The softening point of the resin is measured with a fall type flow tester according to the measuring method prescribed in JIS K 7210. A specific measuring method is shown below.

Using a fall type flow tester (manufactured by Shimadzu Corporation), a sample of 1 cm$^3$ in size is heated at a heating rate of 6° C./min, during which a load of 1,960 N/m$^2$ (20 kg/cm$^2$) is applied thereto by means of a plunger, and a nozzle of 1 mm in diameter and 1 mm in length is so made as to be pushed out to thereby draw a plunger fall level (flow value)-temperature curve. When the height of its sigmoid (S-shaped) curve is represented by h, the temperature with respect to h/2 (the temperature at which a half of the resin has flowed out) is regarded as the softening point.

(iii) Measurement of Glass Transition Point (Tg) and Wax Melting Point:

Measured according to ASTM D3418-82, using as a measuring instrument a differential scanning calorimeter (DSC) MDSC-2920 (manufactured by TA Instruments Co.).

A sample for measurement is precisely weighed in an amount of from 2 to 10 mg, preferably 3 mg. This sample is put in an aluminum pan and an empty aluminum pan is used as reference. Measurement is made in a normal-temperature normal-humidity environment at a heating rate of 10° C./min within the measuring temperature range of from 30° C. to 200° C. Analysis is made on the DSC curve in the temperature range of from 30° C. to 200° C., obtained in the course of the second heating.

In regard to the glass transition point (Tg), a value is used which is found from the resultant DSC curve by analysis made by the middle-point method. Also, in regard to the melting point of the wax, a temperature value of the endothermic main peak in the resultant DSC curve is used.

(iv) Measurement of Particle Size Distribution:

Measuring instrument: Coulter Multisizer IIe (manufactured by Beckman Coulter, Inc.).

As an electrolytic solution, an aqueous 1% NaCl solution is prepared using first-grade sodium chloride. For example, ISOTON R-II (trade name, manufactured by Beckman Coulter, Inc.) may be used. Measurement is made by adding as a dispersant 0.1 to 5 ml of a surface active agent, preferably an alkylbenzene sulfonate, to 100 to 150 ml of the above aqueous electrolytic solution, and further adding 2 to 20 mg of a sample to be measured. The electrolytic solution in which the sample has been suspended is subjected to dispersion treatment for about 1 minute to about 3 minutes in an ultrasonic dispersion machine. The volume distribution and number distribution are calculated by measuring the volume and number of toner particles of 2 μm or more in diameter by means of the above measuring instrument, using an aperture of 100 μm as its aperture. Then the weight-average particle diameter (D4) and number-average particle diameter (D1) according to the present invention (the middle value of each channel is used as the representative value for each channel) are determined.

(v) Measurement of Molecular Weight Distribution of Wax:

Gel permeation chromatography (GPC) measuring apparatus:
GPC-150C (Waters Corp.).
Columns: GMH-HT 30 cm, combination of two columns (available from Tosoh Corporation).
Temperature: 135° C.
Solvent: o-Dichlorobenzene (0.1% ionol-added).
Flow rate: 1.0 ml/min.
Sample: 0.4 ml of 0.15% sample is injected.

Molecular weights are measured under conditions shown above. Molecular weights of the sample are calculated using a molecular weight calibration curve prepared from a monodisperse polystyrene standard sample. The calculated values are further calculated by converting the values in terms of polyethylene according to a conversion equation derived from the Mark-Houwink viscosity equation.

(vi) Measurement of Acid Value:

The acid value of the binder resin may be measured by a conventional method. For example, in a 200 to 300 ml Erlenmeyer flask, 2 to 10 g of a resin sample is weighed and put, followed by addition of about 50 ml of a 30:70 mixed solvent of methanol and toluene to dissolve the resin. If it can not well be dissolved, acetone may be added in a small quantity. Using a 0.1% by weight mixed indicator of Bromothymol Blue and Phenol Red, titration is made with 0.1 mol/liter of a potassium hydroxide-alcohol solution previously standardized, and the acid value is found from the consumption of the potassium hydroxide-alcohol solution according to the following equation.

Acid value=KOH (ml)×n×56.1/sample weight (g)

(n is the factor of 0.1 mol/liter KOH.

EXAMPLES

The present invention is specifically described below by giving Examples. The present invention is by no means limited to these Examples only.

Binder Resin

Production Example 1-1

Monomers for obtaining polyester and an alkylcarboxylic acid tin compound as a catalyst were introduced into a four-necked flask, and a vacuum device, a water separator, a nitrogen gas feeder, a temperature measuring device and a stirrer were fitted thereto. Reaction was carried out in an atmosphere of nitrogen, heating to 230° C. After the reaction was completed, the reaction product was taken out of the flask, then cooled, and thereafter pulverized to obtain Binder Resin 1-1 with a softening point of 138° C. The types of monomers and tin compound used and the physical properties of the resin obtained are shown in Table 6.

Binder Resin

Production Examples 1-2 to 1-10

Binder Resins 1-2 to 1-10 were obtained in the same manner as in Binder Resin Production Example 1-1 except that the amount and type of the monomers and alkylcarboxylic acid tin compound were changed as shown in Table 6 and that the reaction was carried out while confirming softening points and the reaction was completed at points of time where the softening points came to be those shown in Table 6. Physical properties of the resins obtained are shown in Table 6.

Binder Resin

Production Example 1-11

Monomers for obtaining polyester and an alkylcarboxylic acid tin compound were introduced into a four-necked flask, and a vacuum device, a water separator, a nitrogen gas feeder, a temperature measuring device and a stirrer were fitted thereto. With stirring in an atmosphere of nitrogen at a temperature of 130° C., a mixture of vinyl monomers shown in Table 6 and a polymerization initiator (dicumyl peroxide) was dropwise added from a dropping funnel over a period of 4 hours. This was kept at 130° C. for 3 hours, and thereafter heated to 230° C. to carry out reaction. After the reaction was completed, the reaction product was taken out of the flask, and thereafter pulverized to obtain Binder Resin 1-11 with a softening point of 140° C., containing a polyester resin component, a vinyl polymer component and a hybrid resin. The types of monomers and tin compound used and the softening point and other physical properties of the resin obtained are shown in Table 6.

Binder Resin

Production Examples 1-12 to 1-14

Binder Resins 1-12 to 1-14 shown in Table 6 were obtained in the same manner as in Binder Resin Production Example 1-11 except that the type and amount of the monomers and alkylcarboxylic acid tin compound were changed as shown in Table 6. The physical properties of the resin obtained are shown in Table 6.

Comparative Binder Resin

Production Examples 1-a to 1-h

Binder Resins 1-a to 1-h shown in Table 7 were obtained in the same manner as in Binder Resin Production Example 1-1 except that the type and amount of the monomers and alkylcarboxylic acid tin compound were changed as shown in Table 7.

Example 1-1

| (Toner Production Example) | |
|---|---|
| | (by weight) |
| Binder Resin 1-1 | 60 parts |
| Binder Resin 1-6 | 40 parts |
| Magnetic Iron Oxide 1-1 (number-average particle diameter: 0.18 μm; coercive force Hc: 11.1 kA/m; saturation magnetization σs: 83.3 Am$^2$/kg; residual magnetization σr: 13.9 Am$^2$/kg; containing 0.4% by weight of Ti in the magnetic material) | 90 parts |
| T-77 (monoazo iron complex available from Hodogaya Chemical) | 2 parts |
| Polypropylene wax (melting point: 140° C.) | 3 parts |

A mixture of the above materials was melt-kneaded using a twin-screw kneader heated to 120° C. The kneaded product obtained was cooled and then crushed by means of a hammer mill. The crushed product obtained was finely pulverized by means of Turbo Mill (manufactured by Turbo Kogyo Co., Ltd.), and the finely pulverized product thus obtained was classified by means of an air classifier to obtain magnetic toner particles.

To 100 parts by weight of this magnetic toner particles, 1.0 part by weight of hydrophobic dry-process silica (BET specific surface area: 150 m$^2$/g) was externally added by means of a Henschel mixer to obtain Toner 1-1 with a weight-average particle diameter of 7.4 μm.

(Evaluation of Toner)

A commercially available digital copying machine iR3300, manufactured by CANON INC., was used. Using Toner 1-1 of the present invention, a 50,000-sheet paper feed running test was conducted in a normal-temperature normal-humidity environment (temperature: 23° C.; relative humidity: 60%). A chart with an image area percentage of 5% was used as an original. Image evaluation, evaluation on photosensitive drum scrape, and evaluation on toner consumption were made in the following way. The results of each evaluation are shown in Table 10.

(Image Evaluation)

1. Image Density:

Using an original chart with solid black circles (density: 1.1) of 5 mm in diameter, copies were taken and their reflection density was measured at the initial stage of and after the running test. Image density was measured with Macbeth Densitometer (manufactured by Macbeth Co.) and using an SPI filter.

2. Digital-Image Sharpness:

An original having lines and characters was copied. Images at the running test initial stage and after the running test were observed visually or with an magnifier, and were evaluated according to the following criteria.

A: Both character images and line images are faithfully reproduced up to detail images.

B: A disorder or spots around line images somewhat appear(s) on detail images, but at a level of no problem in visual observation.

C: At a level that a disorder or spots around line images is/are seen even in visual observation.

D: A disorder and spots around line images appear in a large number, and the original is not reproduced.

(Photosensitive Drum Scrape)

The photosensitive drum was visually observed at the initial stage of the paper feed running, in the course of the running and after the running, and also image defects were observed to make evaluation according to the following criteria.

A: No defects are seen at all on both the drum surface and the images.

B: A lowering of the gloss of the drum surface is somewhat seen at the latter part of the running, but does not appear on images.

C: Scratches are somewhat seen on the drum surface at the latter part of the running, and non-uniformity somewhat appears also on images.

D: Deep scratches are seen on the drum surface at the latter part of the running, and non-uniformity appears also on images.

(Toner Consumption)

In the image reproduction test, toner consumption was determined from the weight of developing assembly at the initial stage and the weight of developing assembly after 2,000-sheet paper output according to the following expression.

Toner consumption={(weight of developing assembly at the initial stage)−(weight of developing assembly after 2,000-sheet paper output)}/2,000.

As the result, good results were obtained as shown in Table 10.

Examples 1-2 to 1-7

Toners 1-2 to 1-7 were obtained in the same manner as in Example 1-1 except that the types and mixing ratio of the resins were changed as shown in Table 8.

On Toners 1-2 to 1-7 obtained, evaluation was made in the same manner as in Example 1-1. The results of evaluation are shown in Table 10.

Example 1-8

Toner 1-8 was obtained in the same manner as in Example 1-2 except that the magnetic material used therein was changed to Magnetic Iron Oxide 1-2.

Magnetic Iron Oxide 1-2 has a number-average particle diameter of 0.12 μm, an Hc of 12.0 kA/m, a σs of 82.2 Am$^2$/kg and a σr of 15.3 Am$^2$/kg and contains 0.4% by weight of Ti in the magnetic material.

On Toner 1-8 obtained, evaluation was made in the same manner as in Example 1-1. As the result, good results were obtained as shown in Table 10.

Example 1-9

Toner 1-9 was obtained in the same manner as in Example 1-2 except that the magnetic material used therein was changed to Magnetic Iron Oxide 1-3.

Magnetic Iron Oxide 1-3 has a number-average particle diameter of 0.23 μm, an Hc of 10.6 kA/m, a σs of 83.9 Am$^2$/kg and a σr of 12.6 Am$^2$/kg and contains 0.4% by weight of Ti in the magnetic material.

On Toner 1-9 obtained, evaluation was made in the same manner as in Example 1-1. As the result, good results were obtained as shown in Table 10.

Example 1-10

Toner 1-10 was obtained in the same manner as in Example 1-2 except that the magnetic material used therein was changed to Magnetic Iron Oxide 1-4.

Magnetic Iron Oxide 1-4 has a number-average particle diameter of 0.27 μm, an Hc of 9.9 kA/m, a σs of 84.3 Am$^2$/kg and a σr of 11.1 Am$^2$/kg and contains 0.4% by weight of Ti in the magnetic material.

On Toner 1-10 obtained, evaluation was made in the same manner as in Example 1-1. As the result, good results were obtained as shown in Table 10.

Example 1-11

Toner 1-11 was obtained in the same manner as in Example 1-6 except that the magnetic material used therein was changed to Magnetic Iron Oxide 1-5.

Magnetic Iron Oxide 1-5 has a number-average particle diameter of 0.23 μm, an Hc of 10.2 kA/m, a σs of 82.8 Am$^2$/kg and a σr of 12.6 Am$^2$/kg and contains 0.3% by weight of Si in the magnetic material.

On Toner 1-11 obtained, evaluation was made in the same manner as in Example 1-1. As the result, good results were obtained as shown in Table 10.

Example 1-12

Toner 1-12 was obtained in the same manner as in Example 1-6 except that the magnetic material used therein was changed to Magnetic Iron Oxide 1-6.

Magnetic Iron Oxide 1-6 has a number-average particle diameter of 0.23 μm, an Hc of 11.0 kA/m, a σs of 82.1 Am$^2$/kg and a σr of 12.4 Am$^2$/kg and contains 0.3% by weight of Zn in the magnetic material.

On Toner 1-12 obtained, evaluation was made in the same manner as in Example 1-1. As the result, good results were obtained as shown in Table 10.

Example 1-13

Toner 1-13 was obtained in the same manner as in Example 1-6 except that the magnetic material used therein was changed to Magnetic Iron Oxide 1-7.

Magnetic Iron Oxide 1-7 has a number-average particle diameter of 0.23 μm, an Hc of 10.2 kA/m, a σs of 83.0 Am$^2$/kg and a σr of 12.8 Am$^2$/kg and contains 0.3% by weight of Si and 0.3% by weight of Zn in the magnetic material.

On Toner 1-13 obtained, evaluation was made in the same manner as in Example 1-1. As the result, good results were obtained as shown in Table 10.

Comparative Examples 1-1 to 1-4

Comparative Toners 1-1 to 1-4 were obtained in the same manner as in Example 1-9 except that the resins were changed to those shown in Table 9.

On Comparative Toners 1-1 to 1-4 obtained, evaluation was made in the same manner as in Example 1-1. The results of evaluation are shown in Table 10.

Comparative Example 1-5

Comparative Toner 1-5 was obtained in the same manner as in Example 1-4 except that the magnetic material used therein was changed to Magnetic Iron Oxide 1-8.

Magnetic Iron Oxide 1-8 has a number-average particle diameter of 0.08 μm, an Hc of 15.0 kA/m, a σs of 80.0 Am$^2$/kg and a σr of 17.3 Am$^2$/kg and contains 0.4% by weight of Ti in the magnetic material.

On Comparative Toner 1-5 obtained, evaluation was made in the same manner as in Example 1-1. The results of evaluation are shown in Table 10.

Comparative Example 1-6

Comparative Toner 1-6 was obtained in the same manner as in Example 1-4 except that the magnetic material used therein was changed to Magnetic Iron Oxide 1-9.

Magnetic Iron Oxide 1-9 has a number-average particle diameter of 0.36 μm, an Hc of 9.0 kA/m, a σs of 84.8 Am$^2$/kg and a σr of 10.9 Am$^2$/kg and contains 0.4% by weight of Ti in the magnetic material.

On Comparative Toner 1-6 obtained, evaluation was made in the same manner as in Example 1-1. The results of evaluation are shown in Table 10.

(1) Binder Resin Production Examples

| (Production of Binder Resin 2-1) | |
|---|---|
| Trimellitic acid | 365 g |
| Fumaric acid | 336 g |
| Bisphenol-A propylene oxide addition product | 1,060 g |
| Bisphenol-A ethylene oxide addition product | 966 g |

The above monomers were introduced into a four-necked flask in the presence of Wax 2 (described later) as shown in Table 12, together with 14 g of a tin compound Exemplary Compound (3) as a catalyst, and a vacuum device, a water separator, a nitrogen gas feeder, a temperature measuring device and a stirrer were fitted thereto. Reaction was carried out in an atmosphere of nitrogen, heating to 230° C. After the reaction was completed, the reaction product was taken out of the flask, then cooled, and thereafter pulverized to obtain Binder Resin 2-1.

(Production of Binder Resins 2-2 to 2-7)

Binder Resins 2-2 to 2-7 were obtained in the same manner as in the above Production of Binder Resin 2-1 except that the monomers, wax and tin compound were changed to those as shown in Table 11 and that the reaction was carried out while confirming softening points and the reaction was completed at points of time where the softening points came to be those shown in Table 11.

| (Production of Binder Resin 2-8) | |
|---|---|
| Terephthalic acid | 400 g |
| Trimellitic acid | 400 g |
| Dedecenylsuccinic acid | 500 g |
| Bisphenol-A propylene oxide addition product | 700 g |
| Bisphenol-A ethylene oxide addition product | 300 g |

The above polyester monomers were introduced into a four-necked flask together with a tin compound Exemplary Compound (3), and a vacuum device, a water separator, a nitrogen gas feeder, a temperature measuring device and a stirrer were fitted thereto. With stirring in an atmosphere of nitrogen at a temperature of 130° C., a mixture of vinyl monomers (472 g of styrene, 103 g of 2-ethylhexyl acrylate and 0.1 g of divinylbenzene) was dropwise added from a dropping funnel over a period of 4 hours. This was aged for 3 hours as it was kept at 130° C., and then heated to 230° C. to carry out reaction. After the reaction was completed, the reaction product was taken out of the flask, then cooled, and thereafter pulverized to obtain Binder Resin 2-8.

(Production of Binder Resins 2-9, 2-10 & 2-16)

Binder Resins 2-9, 2-10 and 2-16 were obtained in the same manner as in the above Production of Binder Resin 2-8 except that the monomers and wax were changed to those as shown in Table 11 and that the reaction was carried out while confirming softening points and the reaction was completed at points of time where the softening points came to be those shown in Table 11.

(Production of Binder Resins 2-11 to 2-15)

Binder Resins 2-11 to 2-15 were obtained in the same manner as in the above Production of Binder Resin 2-1 except that the monomers, wax and tin compound were changed to those as shown in Table 11 and that the reaction was carried out while confirming softening points and the reaction was completed at points of time where the softening points came to be those shown in Table 11.

(2) Release Agent Production Examples (Production of Wax 1)

Wax 1 having a melting point of 115° C. and an Mw/Mn of 1.31 as measured by GPC was obtained by fractional distillation from polyethylene wax POLYWAX 1000 (available from Toyo Petrolite Co., Ltd.).

(Production of Wax 2)

Wax 2 having a melting point of 100° C. and an Mw/Mn of 1.45 as measured by GPC was obtained by fractional distillation from coal type Fischer-Tropsch Wax C105 (available from Sasol Co.).

(Production of Waxes 3 and 4)

Waxes 3 and 4 preferably having melting points of 75° C. and 60° C. and Mw/Mn of 1.22 and 1.00 as measured by GPC were obtained by fractional distillation from Paraffin Wax HNP-10 and HNP-5 (available from Nippon Seiro Co., Ltd.).

(Production of Wax 5)

Wax 5 having a melting point of 110° C. and an Mw/Mn of 1.75 as measured by GPC was obtained by fractional distillation from Unilin Wax ES844P (available from Toyo-Petrolite Co., Ltd.).

(Production of Wax 6)

Wax 6 having a melting point of 140° C. and an Mw/Mn of 2.33 as measured by GPC was obtained by fractional distillation from alcohol wax YUMEX 1210 (available from Sanyo Chemical Industries, Ltd.).

Example 2-1

| (Production of Toner 2-1) | |
|---|---|
| | (by weight) |
| Binder Resin 2-1 (Table 11) | 105 parts |
| Magnetic Material 2-3 (Table 13) | 90 parts |
| 3,5-Di-t-butylsalicylic acid Al compound | 0.5 part |

The above materials were mixed by means of a Henschel mixer. Thereafter, the mixture obtained was melt-kneaded using a twin-screw kneader heated to 120° C. The kneaded product obtained was cooled and then crushed by means of a hammer mill. The crushed product obtained was finely pulverized by means of a jet mill, and the fine powder thus obtained was classified by means of an air classifier to obtain magnetic toner particles.

To 100 parts by weight of this magnetic toner particles, 1.0 part by weight of hydrophobic oil-treated silica (BET specific surface area: 140 m$^2$/g) was externally added by means of a Henschel mixer to obtain Toner 2-1 with a weight-average particle diameter of 7.0 μm.

Next, on Toner 2-1 obtained, the following evaluation was made. The results of evaluation are shown in Table 15.

A) Toner Running Test

Using a commercially available digital copying machine iR3300, manufactured by CANON INC., an A4-size 50,000-sheet running test to reproduce an original image of 20% in image print percentage was conducted in a high-temperature high-humidity environment (30° C., 80% RH). Changes in toner charge quantity on the sleeve was evaluated before and after the running. After the image reproduction running test, image reproduction was further put forward up to 200,000 sheets to make evaluation on developing sleeve contamination and fixing roller contamination after the running.

(Toner Charge Quantity on Sleeve)

The toner held on the sleeve is collected by suction using a metallic cylinder and a cylindrical filter. In collecting it, the quantity Q of electric charges accumulated in a capacitor through the metallic cylinder is measured, and the mass M of the toner collected is also measured. The electric-charge quantity per unit mass Q/M (mC/kg) is calculated from the quantity Q of electric charges and toner mass M thus measured, and the value found is regarded as toner charge quantity (Q/M).

(Sleeve Contamination)

After the 200,000-sheet running, the toner coat on the developing sleeve was removed by a cleaner and air blowing, and sleeve contamination was evaluated by visual observation. Effects on images were also evaluated together.
A: No problem on both the sleeve and the images.
B: Contamination is somewhat seen at non-image areas on the sleeve, but no problem on the images.
C: Contamination is seen at the upper end of the sleeve, but no problem on the images.
D: Contamination is clearly seen on the sleeve, and low-density areas and the like appear on image edges.
E: Contamination is clearly seen on the sleeve, and low-density areas and the like appear all over the image.

(Fixing Roller Contamination)

After the 200,000-sheet running, the quantity of toner having adhered by taping made on the fixing roller was visually observed to make evaluation by comparison. Evaluation was also made together on the adhesion of toner to the back of image-formed paper during the running.
A: No problem on both the fixing roller and the images.
B: Toner is seen to have somewhat adhered onto the fixing roller, but no problem on the images.
C: Toner is seen to have adhered onto the fixing roller, and the toner is seen to have somewhat adhered to the back of image-formed paper (at a rate of about one sheet in hundreds of sheets) at the latter part of the running, but no problem in practical use.
D: Toner is seen to have adhered onto the fixing roller, and the toner is seen to have adhered to the back of image-formed paper (at a rate of about one sheet in tens of sheets) at the latter part of the running.
E: Toner is seen to have adhered onto the fixing roller, and the toner is seen to have adhered. in lines to the back of image-formed paper for each sheet at the latter part of the running.

B) Low-Temperature Fixing Performance Test

Unfixed images were formed using a digital copying machine iR3300, manufactured by CANON INC. Thereafter, the unfixed images were fixed changing fixing temperature, using an external fixing assembly (the fixing assembly detached from iR3300 and so remodeled that an external drive and a fixing assembly temperature control device were fitted thereto and the process speed was changed to 230 mm/sec). The surfaces of fixed images obtained were rubbed five times under application of a load of 4,900 N/m$^2$ (50 g/cm$^2$), where densities before and after rubbing were measured to measure the rate of loss of density. The temperature at which the rate of loss of density came not more than 20% was regarded as the lowest fixing temperature, and the low-temperature fixing performance was evaluated according to the following criteria.
A: The lowest fixing temperature is less than 145° C.
B: The lowest fixing temperature is from 145° C. to less than 150° C.
C: The lowest fixing temperature is from 150° C. to less than 155° C.
D: The lowest fixing temperature is from 155° C. to less than 160° C.
E: The lowest fixing temperature is 160° C. or more.

Examples 2-2 to 2-10

(Production of Toners 2-2 to 2-10)

Toners 2-2 to 2-10 were obtained in the same manner as in the above Production of Toner 2-1 except that the materials were changed to those shown in Table 14. Evaluation was also made in the same manner as in Example 2-1. The results of evaluation are shown in Table 15.

Comparative Examples 2-1 to 2-6

(Production of Comparative Toners 2-1 to 2-6)

Comparative Toners 2-1 to 2-6 were obtained in the same manner as in the above Production of Toner 2-1 except that the materials were changed to those shown in Table 14. Evaluation was also made in the same manner as in Example 2-1. The results of evaluation are shown in Table 15.

TABLE 6

| | Resin component constituent monomers | | | | | Catalyst | | | | |
|---|---|---|---|---|---|---|---|---|---|---|
| | Polyester monomers | | | Vinyl monomers | | | | | | |
| Binder resin | Monomers | Monomer ratio (mol %) | Proportion (wt. %) | Monomers | Monomer ratio (mol %) | Proportion (wt. %) | Ex. comp. | * Amt. (pbw) | (1) (° C.) | (2) (° C.) | (3) (mgKOH/g) |
| 1-1 | TPA, DSA, TMA, PO-BPA, EO-BPA | 23/15/12/ 35/15 | 100 | — | — | — | (3) | 0.5 | 138 | 62 | 21 |
| 1-2 | FA, TMA, PO-BPA, EO-BPA | 43/7/ 25/25 | 100 | — | — | — | (3) | 0.08 | 125 | 58 | 23 |
| 1-3 | TPA, FA, TMA, PO-BPA, EO-BPA | 31/7/8/ 38/16 | 100 | — | — | — | (3) | 1.2 | 148 | 63 | 7 |
| 1-4 | TPA, DSA, TMA, PO-BPA, EO-BPA | 27/11/8/ 38/16 | 100 | — | — | — | (1) | 0.5 | 135 | 58 | 16 |
| 1-5 | FA, DSA, TMA, PO-BPA, EO-BPA | 32/4/9/ 39/16 | 100 | — | — | — | (5) | 0.5 | 130 | 54 | 10 |
| 1-6 | TPA, DSA, TMA, PO-BPA, EO-BPA | 32/4/21/ 30/13 | 100 | — | — | — | (3) | 0.5 | 94 | 57 | 14 |
| 1-7 | TPA, FA, TMA, PO-BPA, EO-BPA | 22/25/3/ 40/10 | 100 | — | — | — | (3) | 0.08 | 89 | 52 | 26 |

TABLE 6-continued

| Binder resin | Monomers | Polyester monomers Monomer ratio (mol %) | Proportion (wt. %) | Monomers | Vinyl monomers Monomer ratio (mol %) | Proportion (wt. %) | Catalyst Ex. comp. | * Amt. (pbw) | (1) (° C.) | (2) (° C.) | (3) (mgKOH/g) |
|---|---|---|---|---|---|---|---|---|---|---|---|
| 1-8 | TPA, FA, TMA, PO-BPA, EO-BPA | 15/32/1/50/2 | 100 | — | — | — | (3) | 1.2 | 100 | 59 | 10 |
| 1-9 | TPA, FA, TMA, PO-BPA, EO-BPA | 16/21/11/26/26 | 100 | — | — | — | (1) | 0.5 | 97 | 55 | 24 |
| 1-10 | TPA, TMA, PO-BPA | 43/5/52 | 100 | — | — | — | (5) | 0.5 | 105 | 62 | 20 |
| 1-11 | TPA, DSA, TMA, PO-BPA, EO-BPA | 32/5/11/36/16 | 80 | St, 2-EHA, AA | 86/9/3 | 20 | (3) | 0.8 | 140 | 60 | 17 |
| 1-12 | TPA, DSA, FA, TMA PO-BPA, EO-BPA | 20/6/15/9/25/25 | 70 | St, BA | 88/12 | 30 | (3) | 0.3 | 130 | 58 | 19 |
| 1-13 | TPA, DSA, TMA, PO-BPA, EO-BPA | 25/13/12/40/10 | 80 | St, 2-EHA, AA | 86/9/3 | 20 | (3) | 0.8 | 95 | 63 | 21 |
| 1-14 | FA, TMA, PO-BPA | 40/10/50 | 70 | St, BA | 88/12 | 30 | (3) | 0.3 | 105 | 58 | 15 |

*based on 100 pbw of binder resin
(1) Softening point;
(2) Glass transition point;
(3) Acid value
TPA: terephthalic acid;
DSA: dodecenylsuccinic anhydride;
FA: fumaric acid;
TMA: trimellitic acid;
PO-BPA: bisphenol-A propylene oxide adduct;
EO-BPA: bisphenol-A ethylene oxide adduct;
St: styrene;
BA: butyl acrylate;
2-EHA: 2-ethylhexyl acrylate;
AA: acrylic acid

TABLE 7

| Comparative Binder Resin: | Monomers | Polyester monomers Monomer ratio (mol %) | Proportion (wt. %) | Monomers | Vinyl monomers Monomer ratio (mol %) | Proportion (wt. %) | Catalyst Type | * Amt. (pbw) | (1) (° C.) | (2) (° C.) | (3) (mgKOH/g) |
|---|---|---|---|---|---|---|---|---|---|---|---|
| 1-a | TPA, DSA, TMA, PO-BPA, EO-BPA | 32/4/12/26/26 | 100 | — | — | — | Tin propionate $(C_2H_5COO)_2Sn$ | 0.5 | 138 | 60 | 24 |
| 1-b | TPA, DSA, TMA, PO-BPA, EO-BPA | 34/3/13/25/25 | 100 | — | — | — | Tin stearate $(C_{17}H_{35}COO)_2Sn$ | 0.08 | 121 | 65 | 16 |
| 1-c | TPA, FA, PO-BPA, EO-BPA | 17/34/17/32 | 100 | — | — | — | Tin propionate $(C_2H_5COO)_2Sn$ | 0.5 | 89 | 51 | 14 |
| 1-d | TPA, DSA, TMA, FA, PO-BPA, EO-BPA | 28/5/5/5/5/52 | 100 | — | — | — | Tin stearate $(C_{17}H_{35}COO)_2Sn$ | 0.08 | 100 | 59 | 17 |
| 1-e | TPA, DSA, TMA, PO-BPA, EO-BPA | 35/5/8/36/16 | 100 | — | — | — | Dioctyltin oxide | 0.3 | 130 | 60 | 20 |
| 1-f | TPA, FA, AA, PO-BPA | 20/17/15/48 | 100 | — | — | — | Dioctyltin oxide | 0.3 | 94 | 52 | 20 |
| 1-g | TPA, DSA, TMA, PO-BPA, EO-BPA | 30/6/12/36/16 | 70 | St, 2-EHA, AA | 86/9/3 | 30 | Dioctyltin oxide | 0.5 | 140 | 61 | 18 |

TABLE 7-continued

| Comparative Binder Resin: | Resin component constituent monomers | | | | | | | | | | |
|---|---|---|---|---|---|---|---|---|---|---|---|
| | Polyester monomers | | | Vinyl monomers | | | Catalyst | | | | |
| | Monomers | Monomer ratio (mol %) | Proportion (wt. %) | Monomers | Monomer ratio (mol %) | Proportion (wt. %) | Type | * Amt. (pbw) | (1) (° C.) | (2) (° C.) | (3) (mgKOH/g) |
| 1-h | TPA, DSA, TMA, PO-BPA, EO-BPA | 25/13/12/35/15 | 70 | St, 2-EHA, AA | 86/9/3 | 30 | Dioctyltin oxide | 0.5 | 97 | 64 | 19 |

*based on 100 pbw of binder resin
(1) Softening point;
(2) Glass transition point;
(3) Acid value
TPA: terephthalic acid;
DSA: dodecenylsuccinic anhydride;
FA: fumaric acid;
TMA: trimellitic acid;
PO-BPA: bisphenol-A propylene oxide adduct;
EO-BPA: bisphenol-A ethylene oxide adduct;
St: styrene; BA: butyl acrylate;
2-EHA: 2-ethylhexyl acrylate;
AA: acrylic acid

TABLE 8

| | Resin 1 | | Resin 2 | | Magnetic material | | Weight = average particle diameter (μm) |
|---|---|---|---|---|---|---|---|
| | Type | Amt. (pbw) | Type | Amt. (pbw) | Type | Amt. (pbw) | |
| Toner 1-1 | Resin 1-1 | 60 | Resin 1-6 | 40 | Magnetic Iron Oxide 1-1 | 90 | 7.4 |
| Toner 1-2 | Resin 1-2 | 70 | Resin 1-7 | 30 | Magnetic Iron Oxide 1-1 | 90 | 7.7 |
| Toner 1-3 | Resin 1-3 | 50 | Resin 1-8 | 50 | Magnetic Iron Oxide 1-1 | 90 | 7.2 |
| Toner 1-4 | Resin 1-4 | 70 | Resin 1-9 | 30 | Magnetic Iron Oxide 1-1 | 90 | 7.5 |
| Toner 1-5 | Resin 1-5 | 80 | Resin 1-10 | 20 | Magnetic Iron Oxide 1-1 | 90 | 7.6 |
| Toner 1-6 | Resin 1-11 | 70 | Resin 1-13 | 30 | Magnetic Iron Oxide 1-1 | 90 | 7.5 |
| Toner 1-7 | Resin 1-12 | 60 | Resin 1-14 | 40 | Magnetic Iron Oxide 1-1 | 90 | 7.8 |
| Toner 1-8 | Resin 1-2 | 70 | Resin 1-7 | 30 | Magnetic Iron Oxide 1-2 | 90 | 7.1 |
| Toner 1-9 | Resin 1-2 | 70 | Resin 1-7 | 30 | Magnetic Iron Oxide 1-3 | 90 | 7.3 |
| Toner 1-10 | Resin 1-2 | 70 | Resin 1-7 | 30 | Magnetic Iron Oxide 1-4 | 90 | 7.2 |
| Toner 1-11 | Resin 1-11 | 70 | Resin 1-13 | 30 | Magnetic Iron Oxide 1-5 | 90 | 7.5 |
| Toner 1-12 | Resin 1-11 | 70 | Resin 1-13 | 30 | Magnetic Iron Oxide 1-6 | 90 | 7.4 |
| Toner 1-13 | Resin 1-11 | 70 | Resin 1-13 | 30 | Magnetic Iron Oxide 1-7 | 90 | 7.6 |

TABLE 9

| | Resin 1 | | Resin 2 | | Magnetic material | | Weight = average particle diameter (μm) |
|---|---|---|---|---|---|---|---|
| | Type | Amt. (pbw) | Type | Amt. (pbw) | Type | Amt. (pbw) | |
| Comparative Toner 1-1 | Resin 1-a | 60 | Resin 1-c | 40 | Magnetic Iron Oxide 1-3 | 90 | 7.4 |
| Comparative Toner 1-2 | Resin 1-b | 70 | Resin 1-d | 30 | Magnetic Iron Oxide 1-3 | 90 | 7.6 |
| Comparative Toner 1-3 | Resin 1-e | 50 | Resin 1-f | 50 | Magnetic Iron Oxide 1-3 | 90 | 7.5 |
| Comparative Toner 1-4 | Resin 1-g | 80 | Resin 1-h | 20 | Magnetic Iron Oxide 1-3 | 90 | 7.1 |
| Comparative Toner 1-5 | Resin 1-4 | 70 | Resin 1-9 | 30 | Magnetic Iron Oxide 1-8 | 90 | 7.3 |
| Comparative Toner 1-6 | Resin 1-4 | 70 | Resin 1-9 | 30 | Magnetic Iron Oxide 1-9 | 90 | 7.7 |

TABLE 10

| Toner | Image density Initial stage | Image density After 50,000 sheets | Digital-image sharpness Initial stage | Digital-image sharpness After 50,000 sheets | Drum scrape | Toner consumption (mg/sheet) |
|---|---|---|---|---|---|---|
| Example: | | | | | | |
| 1-1 | Toner 1-1 | 1.42 | 1.40 | A | B | A | 40 |
| 1-2 | Toner 1-2 | 1.45 | 1.43 | B | B | B | 45 |
| 1-3 | Toner 1-3 | 1.42 | 1.32 | A | B | A | 35 |
| 1-4 | Toner 1-4 | 1.43 | 1.36 | B | C | C | 45 |
| 1-5 | Toner 1-5 | 1.40 | 1.28 | B | B | B | 40 |
| 1-6 | Toner 1-6 | 1.40 | 1.38 | A | B | A | 40 |
| 1-7 | Toner 1-7 | 1.46 | 1.41 | B | B | B | 40 |
| 1-8 | Toner 1-8 | 1.41 | 1.31 | B | C | C | 40 |
| 1-9 | Toner 1-9 | 1.44 | 1.41 | B | B | B | 50 |
| 1-10 | Toner 1-10 | 1.45 | 1.42 | B | B | B | 55 |
| 1-11 | Toner 1-11 | 1.41 | 1.38 | B | C | C | 55 |
| 1-12 | Toner 1-12 | 1.40 | 1.36 | B | C | C | 55 |
| 1-13 | Toner 1-13 | 1.42 | 1.41 | A | B | A | 50 |
| Comparative Example: | | | | | | |
| 1-1 | Cp. Toner 1-1 | 1.40 | 1.30 | B | C | D | 50 |
| 1-2 | Cp. Toner 1-2 | 1.41 | 1.09 | B | C | B | 45 |
| 1-3 | Cp. Toner 1-3 | 1.45 | 1.38 | B | C | C | 60 |
| 1-4 | Cp. Toner 1-4 | 1.42 | 1.37 | B | C | C | 60 |
| 1-5 | Cp. Toner 1-5 | 1.38 | 1.05 | C | D | D | 45 |
| 1-6 | Cp. Toner 1-6 | 1.40 | 1.37 | B | C | B | 65 |

Cp.: Comparative

TABLE 11

| Binder Resin | Acid components TPA (g) | Acid components TMA (g) | Acid components Other (g) | Alcohol components PO-BPA (g) | Alcohol components EO-BPA (g) | Alcohol components Other(s) (g) | Catalyst Ex. comp. | Catalyst Amt. (pbw) | Wax Type | Wax Amt. (pbw) | added when* (1) (° C.) | (2) (° C.) | (3) (mgKOH)/g |
|---|---|---|---|---|---|---|---|---|---|---|---|---|---|
| 2-1 | — | 365 | FA/336 | 1,060 | 966 | — | (3) | 0.5 | 2 | 5 | 120 | 58 | 20 |
| 2-2 | 415 | 307 | — | 1,060 | 966 | — | (1) | 0.5 | 2 | 5 | 128 | 61 | 18 |
| 2-3 | — | 288 | FA/325 | 1,130 | 1,030 | — | (5) | 0.5 | 2 | 5 | 122 | 57 | 16 |
| 2-4 | — | 365 | FA/336 | 1,060 | 966 | — | (3) | 1.5 | 1 | 7 | 124 | 59 | 19 |
| 2-5 | — | 365 | FA/336 | 1,060 | 966 | — | (3) | 0.5 | 2 | 7 | 119 | 57 | 24 |
| 2-6 | — | 288 | FA/325 | 1,130 | 1,030 | — | (5) | 0.5 | 5 | 5 | 120 | 57 | 17 |
| 2-7 | — | 365 | FA/336 | 1,060 | 966 | — | (3) | 0.5 | 3 | 5 | 122 | 58 | 20 |
| 2-8 | 400 | 400 | DSA/500 | 700 | 300 | St/472, 2-EHA/103, DVB/0.1 | (3) | 0.5 | — | — | 130 | 62 | 12 |
| 2-9 | 400 | 400 | DSA/500 | 700 | 300 | St/472, 2-EHA/103, DVB/0.1 | (3) | 0.5 | 2 | 5 | 132 | 63 | 14 |
| 2-10 | 400 | 267 | DSA/500 | 467 | 200 | St/472, 2-EHA/103, DVB/0.1 | (3) | 0.5 | 2 | 5 | 100 | 55 | 30 |
| 2-11 | 473 | — | FA/336 | 1,060 | — | EG/280 | DOT | 0.5 | 2 | 5 | 116 | 55 | 19 |
| 2-12 | — | 288 | FA/325 | 1,130 | 1,030 | — | (5) | 0.5 | 1 | 5 | 120 | 56 | 15 |
| 2-13 | — | 365 | FA/336 | 1,060 | 966 | — | (3) | 1.5 | 1 | 5 | 129 | 58 | 14 |
| 2-14 | 415 | 307 | — | 1,060 | 966 | — | (1) | 0.5 | 4 | 8 | 125 | 60 | 20 |

TABLE 11-continued

| Binder Resin: | Acid components | | | Alcohol components | | | Catalyst | | Wax added when* | | (1) (° C.) | (2) (° C.) | (3) (mgKOH)/g |
|---|---|---|---|---|---|---|---|---|---|---|---|---|---|
| | TPA (g) | TMA (g) | Other (g) | PO-BPA (g) | EO-BPA (g) | Other(s) (g) | Ex. comp. | Amt. (pbw) | Type | Amt. (pbw) | | | |
| 2-15 | — | 365 | FA/336 | 1,060 | 966 | — | (5) | 0.5 | 6 | 5 | 125 | 58 | 21 |
| 2-16 | — | 384 | DSA/510 | 1,130 | 1,030 | St/290, 2-EHA/64 | — | — | — | — | 130 | 62 | 13 |

*resin is produced
Catalyst: Content of the wax is the value based on 100 parts by weight of binder resin.
(1) Softening point;
(2) Glass transition point;
(3) Acid value
TPA: terephthalic acid;
TMA: trimellitic acid;
FA: fumaric acid;
DSA: dodecenylsuccinic acid;
PO-BPA: bisphenol-A propylene oxide adduct;
EO-BPA: bisphenol-A ethylene oxide adduct;
St: styrene;
2-EHA: 2-ethylhexyl acrylate;
DVB: divinylbenzene;
DOT: dioctyltin;
EG: ethylene glycol

TABLE 12

| | Type | Melting point (° C.) | Mw/Mn |
|---|---|---|---|
| Wax 1 | Hydrocarbon wax | 115 | 1.31 |
| Wax 2 | Hydrocarbon wax | 100 | 1.45 |
| Wax 3 | Hydrocarbon wax | 75 | 1.22 |
| Wax 4 | Hydrocarbon wax | 60 | 1.10 |
| Wax 5 | Alcohol wax | 110 | 1.75 |
| Wax 6 | Alcohol wax | 140 | 2.33 |

TABLE 13

| | Type | Average particle diameter (μm) |
|---|---|---|
| Magnetic Material 2-1 | Magnetic iron oxide | 0.06 |
| Magnetic Material 2-2 | Magnetic iron oxide | 0.13 |
| Magnetic Material 2-3 | Magnetic iron oxide | 0.17 |
| Magnetic Material 2-4 | Magnetic iron oxide | 0.24 |
| Magnetic Material 2-5 | Magnetic iron oxide | 0.35 |

TABLE 14

| | Binder resin | | | Magnetic material | | Wax | | Charge control agent | |
|---|---|---|---|---|---|---|---|---|---|
| | Type | Content (pbw) | Amt. of wax contained (pbw) | Type | Content (pbw) | Type | Content (pbw) | Type | Content (pbw) |
| Example: | | | | | | | | | |
| 2-1 | 2-1 | 105 | 5 | 2-3 | 90 | — | — | Salicylic acid Al comp. | 0.5 |
| 2-2 | 2-2 | 105 | 5 | 2-3 | 90 | — | — | Salicylic acid Al comp. | 0.5 |
| 2-3 | 2-3 | 105 | 5 | 2-3 | 90 | — | — | Salicylic acid Al comp. | 0.5 |
| 2-4 | 2-4 | 107 | 7 | 2-3 | 90 | — | — | Salicylic acid Al comp. | 0.5 |
| 2-5 | 2-5 | 107 | 7 | 2-2 | 90 | — | — | Salicylic acid Al comp. | 0.5 |
| 2-6 | 2-6 | 105 | 5 | 2-4 | 90 | — | — | Salicylic acid Al comp. | 0.5 |
| 2-7 | 2-7 | 105 | 5 | 2-4 | 90 | — | — | Salicylic acid Al comp. | 0.5 |
| 2-8 | 2-8 | 100 | — | 2-2 | 90 | Wax 1 | 5 | Salicylic acid Al comp. | 0.5 |
| 2-9 | 2-9 | 105 | 5 | 2-2 | 90 | — | — | Salicylic acid Al comp. | 0.5 |
| 2-10 | 2-9:2-10 (=7:3) | 105 | 5 | 2-3 | 90 | — | — | Salicylic acid Al comp. | 0.5 |
| Comparative Example: | | | | | | | | | |
| 2-1 | 2-11 | 105 | 5 | 2-2 | 90 | — | — | Salicylic acid Al comp. | 0.5 |
| 2-2 | 2-12 | 105 | 5 | 2-1 | 90 | — | — | Salicylic acid Al comp. | 0.5 |

TABLE 14-continued

| | Binder resin | | | Magnetic material | | Wax | | Charge control agent | |
|---|---|---|---|---|---|---|---|---|---|
| | Type | Content (pbw) | Amt. of wax contained (pbw) | Type | Content (pbw) | Type | Content (pbw) | Type | Content (pbw) |
| 2-3 | 2-13 | 105 | 5 | 2-5 | 90 | — | — | Salicylic acid Al comp. | 0.5 |
| 2-4 | 2-14 | 108 | 8 | 2-3 | 90 | — | — | Salicylic acid Al comp. | 0.5 |
| 2-5 | 2-15 | 105 | 5 | 2-2 | 90 | — | — | Salicylic acid Al comp. | 0.5 |
| 2-6 | 2-16 | 100 | — | 2-2 | 90 | Wax 1 | 5 | Salicylic acid Al comp. | 0.5 |

TABLE 15

| | Weight = average particle diameter (μm) | Evaluation results | | | | |
|---|---|---|---|---|---|---|
| | | Charge quantity | | | | |
| | | Before running (mC/kg) | After running (mC/kg) | Sleeve contamination | Fixing roller contamination | Low-temperature fixing performance |
| Example: | | | | | | |
| 2-1 | 7.0 | −6.0 | −5.2 | A | A | A |
| 2-2 | 7.2 | −6.1 | −5.2 | A | B | B |
| 2-3 | 7.3 | −5.6 | −4.7 | B | A | B |
| 2-4 | 7.5 | −5.7 | −4.8 | B | B | B |
| 2-5 | 7.4 | −6.5 | −5.2 | B | A | A |
| 2-6 | 7.2 | −5.3 | −4.4 | B | C | B |
| 2-7 | 7.2 | −5.4 | −4.8 | B | A | A |
| 2-8 | 7.3 | −6.2 | −5.3 | B | B | A |
| 2-9 | 7.4 | −6.3 | −5.4 | A | A | A |
| 2-10 | 7.2 | −5.9 | −5.1 | A | A | A |
| Comparative Example: | | | | | | |
| 2-1 | 7.3 | −5.2 | −3.5 | C | C | B |
| 2-2 | 7.4 | −6.0 | −3.1 | D | D | D |
| 2-3 | 7.7 | −4.1 | −3.0 | D | D | D |
| 2-4 | 7.1 | −4.2 | −3.5 | D | E | C |
| 2-5 | 7.3 | −4.7 | −4.0 | C | E | E |
| 2-6 | 7.5 | −4.2 | −3.3 | D | C | C |

What is claimed is:

1. A magnetic toner comprising toner particles having at least a binder resin and a magnetic material,
wherein said binder resin is chiefly composed of a resin having a polyester unit synthesized using tin 2-ethylhexanoate as a catalyst, and said magnetic material has a number-average particle diameter of form 0.1 μm to 0.3 μm.

2. The magnetic toner according to claim 1, wherein said binder resin is a resin having two or more softening points.

3. The magnetic toner according to claim 1, wherein in said binder resin the resin having a polyester unit is a non-linear polyester cross-linked with at least one of a tribasic or higher polybasic carboxylic acid and a trihydric or higher polyhydric alcohol.

4. The magnetic toner according to claim 1, wherein said magnetic material contains a silicon element in particle interiors and/or at particle surfaces.

5. The magnetic toner according to claim 1, wherein said magnetic material contains a zinc element in particle interiors and/or at particle surfaces.

6. The magnetic toner according to claim 1, wherein said magnetic material contains a titanium element in particle interiors and/or at particle surfaces.

7. The magnetic toner according to claim 1, which comprises an azo type iron complex.

8. The magnetic toner according to claim 1, which comprises an aromatic oxycarboxylic acid metal compound.

9. The magnetic toner according to claim 1, which further comprises a release agent having a melting point of from 70° C. to 120° C.

10. The magnetic toner according to claim 9, wherein said release agent is an aliphatic hydrocarbon wax.

11. The magnetic toner according to claim 1, which contains as a release agent an aliphatic hydrocarbon wax having a melting point of from 80° C. to 115° C.

12. The magnetic toner according to claim 1, which contains as a release agent an aliphatic hydrocarbon wax having a melting point of from 90° C. to 110° C.

13. The magnetic toner according to claim 1, wherein said binder resin has an acid value of from 1 mg·KOH/g to 50 mg·KOH/g.

* * * * *